United States Patent
Lee et al.

(10) Patent No.: US 12,047,772 B2
(45) Date of Patent: Jul. 23, 2024

(54) METHOD FOR STARTING ELECTRIC SCOOTER BY USING EXCHANGEABLE BATTERY PACK EMPLOYING WIRELESS COMMUNICATION SCHEME

(71) Applicant: LG ENERGY SOLUTION, LTD., Seoul (KR)

(72) Inventors: Jung Hoon Lee, Daejeon (KR); Yean Sik Choi, Daejeon (KR); Sung Gun Lee, Daejeon (KR)

(73) Assignee: LG Energy Solution Ltd., Seoul (KR)

( * ) Notice: Subject to any disclaimer, the term of this patent is extended or adjusted under 35 U.S.C. 154(b) by 79 days.

(21) Appl. No.: 17/604,976

(22) PCT Filed: Nov. 30, 2020

(86) PCT No.: PCT/KR2020/017239
§ 371 (c)(1),
(2) Date: Oct. 19, 2021

(87) PCT Pub. No.: WO2021/112508
PCT Pub. Date: Jun. 10, 2021

(65) Prior Publication Data
US 2022/0295275 A1    Sep. 15, 2022

(30) Foreign Application Priority Data

Dec. 4, 2019 (KR) .................. 10-2019-0160172

(51) Int. Cl.
*H04W 12/06* (2021.01)
*B60L 1/00* (2006.01)
(Continued)

(52) U.S. Cl.
CPC .............. *H04W 12/06* (2013.01); *B60L 1/00* (2013.01); *B60L 50/60* (2019.02); *B60L 53/80* (2019.02);
(Continued)

(58) Field of Classification Search
CPC ......... H04W 12/06; H04W 4/40; H04W 4/80; B60L 1/00; B60L 53/80; B60L 53/305;
(Continued)

(56) References Cited

U.S. PATENT DOCUMENTS

| | | | |
|---|---|---|---|
| 11,155,179 B2 | 10/2021 | Lin et al. | |
| 2015/0240773 A1* | 8/2015 | Koenen | F02N 11/12 |
| | | | 290/38 R |
| 2019/0283621 A1 | 9/2019 | Lin et al. | |

FOREIGN PATENT DOCUMENTS

| CN | 101145250 A | 3/2008 |
|---|---|---|
| CN | 100545875 C | 9/2009 |

(Continued)

OTHER PUBLICATIONS

International Search Report (with partial translation) and Written Opinion issued in corresponding International Patent Application No. PCT/KR2020/017239, dated Mar. 5, 2021.

(Continued)

*Primary Examiner* — Michael J Zanelli
(74) *Attorney, Agent, or Firm* — Morgan, Lewis & Bockius LLP

(57) ABSTRACT

The present invention relates to a method of turning on an electric scooter by supplying power to the ECU when the interchangeable battery pack is driven by eliminating the auxiliary battery that always supplies power to the ECU that turns on the start of the electric scooter, providing an interchangeable battery packs using wireless communication type, and using a wireless communication signal received from a smart device as a driving signal of the interchangeable battery pack.

12 Claims, 3 Drawing Sheets

(51) Int. Cl.
  *B60L 50/60* (2019.01)
  *B60L 53/80* (2019.01)
  *B60L 58/10* (2019.01)
  *H02J 7/00* (2006.01)
  *H04W 4/80* (2018.01)

(52) U.S. Cl.
  CPC .......... *B60L 58/10* (2019.02); *H02J 7/00045* (2020.01); *H04W 4/80* (2018.02); *B60Y 2200/126* (2013.01)

(58) Field of Classification Search
  CPC .. B60L 58/10; B60L 2220/24; H02J 7/00045; Y02T 10/72; Y02T 10/7072; Y02T 10/70; Y02T 90/12; Y02T 90/16; B62J 43/23; B62J 45/00; B60R 25/24; B60R 25/40; B60R 25/102; B60R 25/403; B60R 2325/103; B60R 2325/101; B62H 5/00; B62K 2204/00; B60Y 2200/126; B60Y 2200/91; B60Y 2200/92; H04Q 2209/43
  See application file for complete search history.

(56) References Cited

FOREIGN PATENT DOCUMENTS

| CN | 202059188 U | * | 11/2011 |
|---|---|---|---|
| CN | 202413703 U | | 9/2012 |
| CN | 108082341 A | | 5/2018 |
| CN | 110271635 A | | 9/2019 |
| CN | 113612299 A | | 11/2021 |
| JP | 2005-314962 A | | 11/2005 |
| JP | 2012-237133 A | | 12/2012 |
| JP | 2015-074361 A | | 4/2015 |
| JP | 5794097 B2 | | 10/2015 |
| JP | 2017-143596 A | | 8/2017 |
| JP | 2019-180226 A | | 10/2019 |
| KR | 10-0718012 B1 | | 5/2007 |
| KR | 10-2012-27916 A | | 3/2012 |
| KR | 10-2013-0061625 A | | 6/2013 |
| KR | 10-2017-0142499 A | | 12/2017 |
| KR | 10-1853126 B1 | | 6/2018 |
| KR | 10-2018-0113903 A | | 10/2018 |
| KR | 10-2018-120033 A | | 11/2018 |
| KR | 10-1918550 B1 | | 2/2019 |
| KR | 10-1945236 B1 | | 2/2019 |
| WO | 2017/217822 A1 | | 12/2017 |

OTHER PUBLICATIONS

Extended European Search Report dated May 19, 2022 issued by the European Patent Office in corresponding European Patent Application No. 20897196.0.
Office Action dated Oct. 11, 2022, issued by the Japanese Patent Office in corresponding Japanese Patent Application No. 2021-556295.
Notice of Allowance dated May 15, 2023, issued in corresponding Japanese Patent Application No. 2021-556295.
First Office Action dated Jun. 9, 2023, issued in corresponding Chinese Patent Application No. 202080020012.4.

* cited by examiner

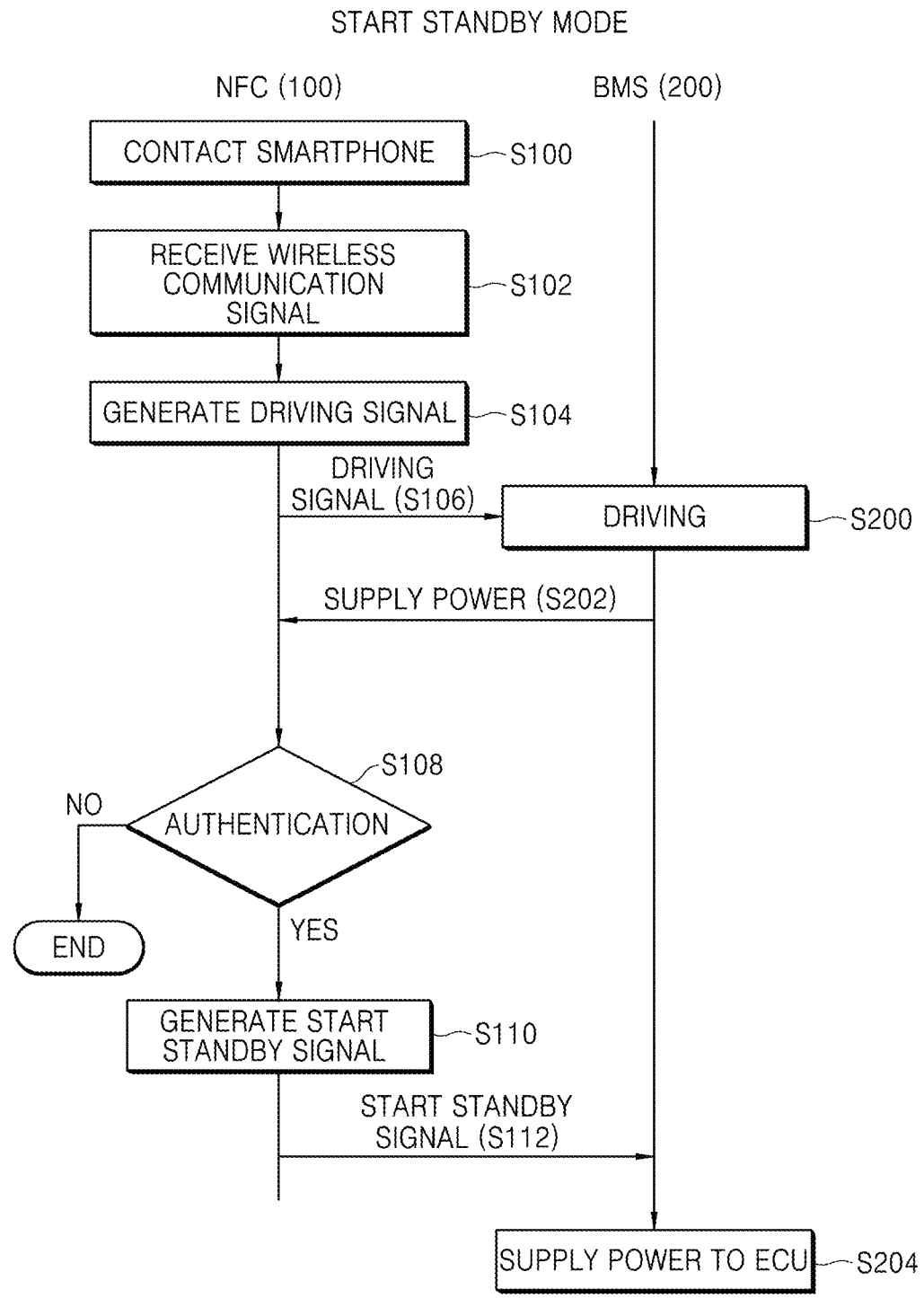

METHOD FOR STARTING ELECTRIC SCOOTER BY USING EXCHANGEABLE BATTERY PACK EMPLOYING WIRELESS COMMUNICATION SCHEME

TECHNICAL FIELD

The present invention relates to a method and device for starting an electric scooter using a wireless communication type interchangeable battery pack, and more particularly, to a method and device for starting an electric scooter without an auxiliary battery by providing a Near Field Communication (NFC) module in the interchangeable battery pack, driving the battery pack wirelessly, and directly supplying power from the battery pack to the Electronic Control Unit (ECU) of the electric scooter.

BACKGROUND ART

In the case of conventional scooters, petroleum fuels such as gasoline and diesel are used, but recently, electric scooters driven by electricity have appeared. An electric scooter refers to a scooter that uses no petroleum fuel and engine, but uses an electric battery and an electric motor.

Such an electric scooter must perform communication authentication with a smart key or mobile phone in order to connect the drive main battery to the drive unit and turn on the engine (to connect the power source). For this, the power of the auxiliary battery that always supplies power to the Electronic Control Unit (ECU) that performs communication authentication with the smart device was required.

However, if the electric scooter is left unused for a long time, the auxiliary battery of the electric scooter may be self-discharged and in this case, it is understood that the auxiliary battery cannot supply power to the ECU at all times, and the electric scooter cannot be started, so that the electric scooter could be started only by connecting the power source from the outside to turn on the ignition or charging the auxiliary battery through connection between the power source and the auxiliary battery.

(Patent Document 0001) KR 2017-0142499 A

DISCLOSURE

Technical Problem

In order to solve this problem, by removing the auxiliary battery of the electric scooter and forming a wireless communication (NFC or Bluetooth) module on the interchangeable battery pack, the interchangeable battery pack is driven by direct communication authentication between the NFC module of the interchangeable battery pack and the smart device, and the interchangeable battery pack directly supplies power to the electric scooter's ECU to start the electric scooter, so that even when the electric scooter is not used for a long time, the present invention provides a method for starting the engine.

Technical Solution

According to an embodiment of the present invention, A method of starting an electric scooter using a wireless communication type interchangeable battery pack includes: providing an NFC module in an interchangeable battery pack of an electric scooter, wherein the NFC module receives a wireless communication signal from a smart device; using the received wireless communication signal as a driving signal for an interchangeable battery pack; when the interchangeable battery pack is driven, supplying power to an NFC module to perform wireless communication authentication between the NFC module and the smart device; supplying power to an ECU by the interchangeable battery pack when the mutual wireless communication authentication is completed; and turning on, by the ECU, the start of the electric scooter using the supplied power.

In addition, the using of the wireless communication signal received from the smart device as an interchangeable battery pack driving signal includes: generating the interchangeable battery pack driving signal using the wireless communication signal received from the smart device; and driving a BMS of the interchangeable battery pack using the generated driving signal.

In addition, the performing of the mutual wireless communication authentication by the NFC module and the smart device includes: comparing a unique identification number stored in the smart device with a unique identification number stored in the NFC module of the electric scooter; and generating, by the NFC module, a start standby signal when the unique identification numbers of the smart device and the electric scooter are the same in the comparing of the unique identification numbers.

In addition, the method further includes: transmitting the generated start standby signal to the BMS of the battery pack; and supplying, by the BMS, power to the ECU by turning on an ECU power switch.

According to an embodiment of the present invention, provided is a wireless communication type interchangeable battery pack for supplying power to an electric scooter, wherein the interchangeable battery pack includes an NFC module configured to receive a wireless communication signal from a smart device and apply a driving signal to the interchangeable battery pack to perform wireless communication authentication by receiving power from the battery pack when the interchangeable battery pack is driven, wherein the NFC module includes: a contact module configured to receive a wireless communication signal from the smart device by bringing a smart device closer and generate the received signal as an interchangeable battery pack driving signal; and an authentication module configured to authenticate a battery pack using a wireless communication signal received from the smart device.

In addition, the contact module includes: an energy collection unit configured to generate a wireless communication signal received from the smart device as an interchangeable battery pack driving signal using an energy harvesting technology; a signal conversion unit configured to convert the generated interchangeable battery pack driving signal into a DC signal; and a signal transmission unit configured to transmit the converted DC signal to a battery pack.

In addition, the interchangeable battery pack further includes a BMS for supplying power to a driving unit of the electric scooter to operate the electric scooter or controlling charging or discharging of the interchangeable battery pack.

In addition, a DC signal converted by the signal conversion unit activates a BMS of the battery pack.

Moreover, according to an embodiment of the present invention, a device includes the interchangeable battery pack as a power source.

In addition, the device is any one selected from the group consisting of an electric bike, an electric bicycle, an electric kickboard, an electric vehicle, a hybrid electric vehicle, and a plug-in hybrid electric vehicle.

Advantageous Effects

According to the present invention, it is possible to use a driving signal of the interchangeable battery pack by using wireless communication technology in the interchangeable battery pack, and the electric scooter can be started even if the power is not always applied to the ECU that starts the electric scooter, and the battery pack does not discharge even if the electric scooter is not used for a long time.

In addition, it is possible to eliminate the auxiliary battery of the electric scooter by directly supplying necessary power from the interchangeable battery pack, thereby reducing the weight of the electric scooter, increasing fuel efficiency, and reducing manufacturing cost.

DESCRIPTION OF DRAWINGS

FIG. 5 is a block diagram of a start method of an electric scooter using a wireless communication type interchangeable battery pack according to an embodiment of the present invention.

MODE FOR INVENTION

Hereinafter, exemplary embodiments of the present invention will be described in detail with reference to the accompanying drawings. However, the present invention is not limited to the embodiments disclosed below, but will be implemented in various different forms, and these embodiments are provided to complete the disclosure of the present invention, and to fully inform a person of ordinary skill in the scope of the invention.

Figure 1:
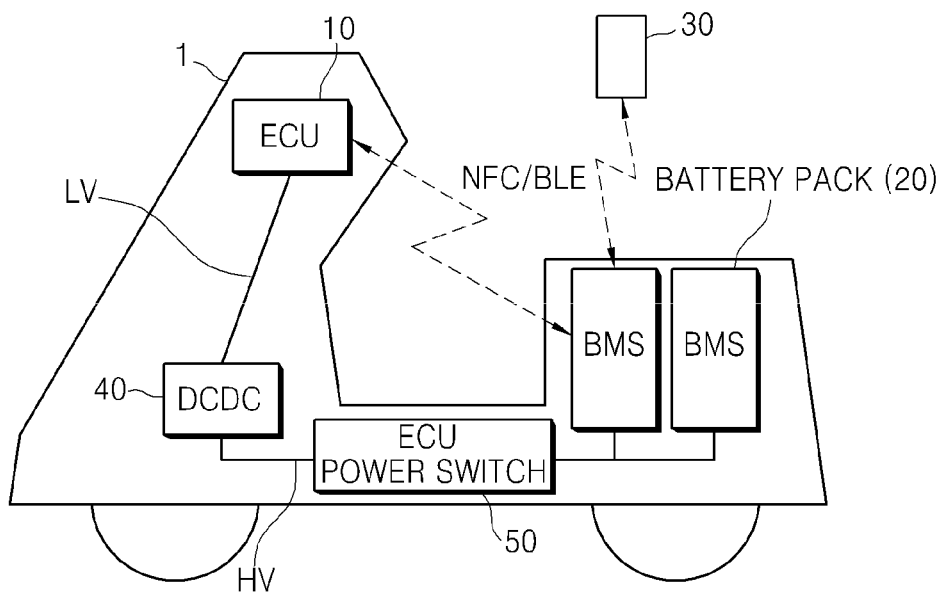
FIG. 1 is a block diagram of an electric scooter to which an interchangeable battery pack is applied according to an embodiment of the present invention.

1. 1. Electric Scooter with Wireless Communication Type Interchangeable Battery Pack Referring to FIG. 1, an electric scooter 1 using a wireless communication type interchangeable battery pack according to an embodiment of the present invention may include an Electronic Control Unit (ECU) 10 for turning on the start of the electric scooter 1 and controlling the operation of the electric scooter 1, a battery pack 20 for supplying power to the ECU 10 that turns on the electric scooter 1 and supplying or cutting power to a driving unit (not shown) by an operation command of the ECU 10, a smart device 30 for mutual authentication using a wireless communication unit (NFC module) 100 of the battery pack 20 and a wireless communication technology, and driving the battery pack 20, and a DCDC converter 40 for converting high power supplied from the battery pack 20 into low power and supplying the low power to the ECU 10.

1) ECU 10

The electric scooter 1 according to an embodiment of the present invention may include an ECU 10 that turns on the start of the electric scooter 1 and controls a driving unit (not shown) of the electric scooter 1. When wireless communication authentication between the smart device 10 and the battery pack 20 is completed, the ECU 10 receives power from the battery pack 20 and turns on the start of the electric scooter 1. In detail, when the wireless communication authentication is completed, a start standby signal is generated in the NFC module 100 to be described later and transmitted to the battery pack 20, and when the battery pack 20 receives a start standby signal, the ECU 10 supplies constant power to the ECU 10 so that the ECU 10 is switched to the start standby mode. Meanwhile, the ECU 10 may further include an NFC terminal (not shown). The NFC terminal (not shown) performs mutual authentication using the NFC module 100 provided in the battery pack 20 and wireless communication technology after turning on the start of the electric scooter 1. Specifically, it is determined whether the unique identification number of the battery pack 20 matches the unique identification number of the electric scooter 1 stored in the ECU 10, and mutual authentication is performed. For this, the unique identification number of the battery pack 20 may be stored and used in the NFC terminal (not shown).

Meanwhile, when the mutual authentication between the ECU 10 and the battery pack 20 is completed, the NFC terminal (not shown) may transmit a signal for driving the electric scooter 1 to the NFC module 100 of the battery pack 20 using wireless communication technology. In addition, the status information of the battery pack 20, for example, the remaining battery capacity, the battery charging speed, etc., received from the NFC module 100 of the battery pack 20 may be displayed on a display unit (not shown) of the ECU 10.

On the other hand, when mutual authentication is completed between the ECU 10 and the battery pack 20, the ECU 10 may transmit a signal for driving the electric scooter 1 to the NFC module 100 of the battery pack 20. The received signal is transmitted to the BMS 200 to control a driving switch (not shown) connected between the battery pack 20 and a driving unit (not shown) to be turned on and/or off so that the received signal can control the operation of the electric scooter 1 by supplying and/or blocking power to the driving unit (not shown).

2) Battery Pack 20

The battery pack 20 according to an embodiment of the present invention stores and provides electrical energy. The battery pack 20 may include a plurality of battery cells (not shown) capable of charging and discharging. In addition, in the battery pack 20, a predetermined number of battery cells (not shown) may form a battery module. That is, the battery pack 20 may include at least one battery module, and the battery module may include a plurality of battery cells (not shown). Here, the type of the battery cell (not shown) is not particularly limited, and may include, for example, a lithium ion battery, a lithium polymer battery, a nickel cadmium battery, a nickel hydride battery, a nickel zinc battery, and the like.

Meanwhile, the battery pack 20 may include a wireless communication module (NFC module) 100 that performs wireless communication authentication with the smart device 30 through wireless communication technology, mutually authenticates with the ECU 10 through wireless communication technology, and transmits and receives a signal for controlling the operation of the electric scooter 1 when the mutual authentication is completed and a BMS 200 that is driven using a wireless communication signal received from the smart device 30, and controls the driving unit (not shown) of the electric scooter 1.

(1) NFC Module 100

Figure 2:
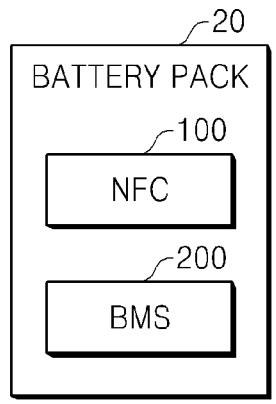
FIG. 2 is a detailed view of an interchangeable battery pack according to an embodiment of the present invention.
Figure 3:
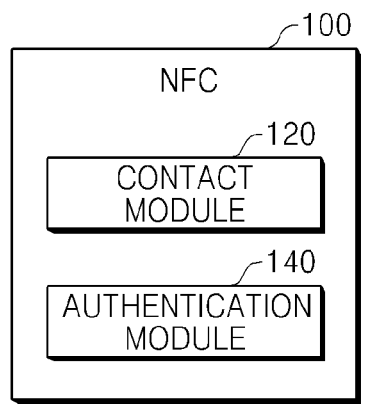
FIG. 3 is a detailed view of an NFC module provided in an interchangeable battery pack according to an embodiment of the present invention.
Figure 4:
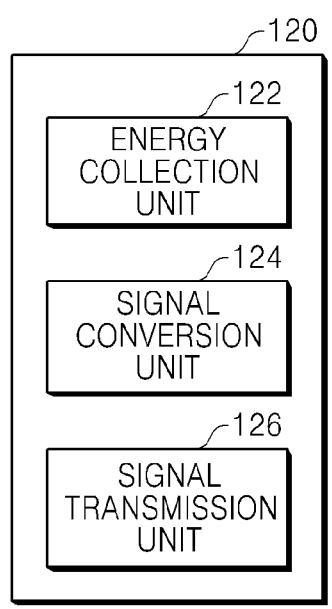
FIG. 4 is a detailed diagram of a contact module of NFC according to an embodiment of the present invention.

Referring to FIG. 2, the battery pack 20 according to an embodiment of the present invention may include an NFC module 100 for wireless communication and mutual authentication with the smart device 30 and/or the ECU 10.

Specifically, the NFC module 100 wirelessly communicates with the smart device 30 using wireless communication technology, and performs wireless communication authentication using a signal received through wireless communication. In addition, wireless communication is performed using a wireless communication technology with an NFC terminal (not shown) provided in the ECU 10, and mutual authentication with the ECU 10 is performed using a signal received through wireless communication.

First, a configuration for wireless communication authentication by wireless communication with the smart device 30 will be described.

The NFC module 100 may include a contact module 120 that receives a wireless communication signal from the smart device 30 when approaching the smart device 30 close to the NFC module 100 and converts the received wireless communication signal into an electric signal using energy harvesting technology, and an authentication module 140 for mutual authentication using the received wireless communication signal of the smart device 30.

Meanwhile, the contact module 120 may include an energy collection unit 122 for receiving a wireless communication signal from the smart device 30 when approaching the smart device 30 close to the NFC module 100, and generating an electric signal using an energy harvesting technology for the wireless communication signal, a signal conversion unit 124 for converting the generated electrical signal into a DC signal, and a signal transmission unit 126 for transmitting the converted DC signal to the battery pack 20.

Meanwhile, the energy collection unit 122 receives a wireless communication signal from the smart device 30 and generates a driving signal for the battery pack 20. The energy collection unit 122 generates a driving signal of the battery pack 20 using an energy harvesting technique. The energy harvesting technology generally refers to a method of acquiring energy using the surrounding environment. In the present invention, a method of using a wireless communication signal of NFC (not shown) provided in the smart device 30 as an energy source is used. However, the present invention is not limited thereto, and a radio frequency (RF) or Bluetooth wireless communication signal may be used as an energy source.

Meanwhile, the signal conversion unit 124 converts the driving signal of the battery pack 20 generated by the energy collection unit 122 into a DC signal. For this, the signal conversion unit 124 may include a rectifier (not shown). The driving signal of the battery pack 20 may be an AC signal having a positive upper limit value and a negative lower limit value, and the rectifier (not shown) converts the AC signal into a DC signal.

Meanwhile, the signal transmission unit 126 transmits the driving signal of the battery pack 20 converted by the signal conversion unit 124 to the BMS 200 to be described later. The transmitted driving signal of the battery pack 20 drives the BMS 200 to be described later.

Meanwhile, the authentication module 140 performs wireless communication authentication using a wireless communication signal received from the contact module 120. Specifically, wireless communication authentication is performed by checking whether the unique identification number of the smart device 30 matches the unique identification number of the battery pack 20. For this, an authentication management server (not shown) for registering and storing a unique identification number allocated to the smart device 30 and a unique identification number allocated to the battery pack 20 of the electric scooter 1 may be further included. Through the authentication management server (not shown), the unique identification number of the battery pack 20 and the unique identification number of the smart device 30 can be registered and stored and used, and the smart device 30 transmits a unique identification number stored in the authentication management server (not shown) to the NFC module 100 of the battery pack 20 using wireless communication technology. Accordingly, the authentication module 140 performs wireless communication authentication based on whether the unique identification number received by the NFC module 100 matches the unique identification number of the battery pack 20. For this, the unique identification number of the battery pack 20 may be stored and used in the authentication module 140.

Meanwhile, the NFC module 100 performs mutual authentication with the ECU 10 to drive the electric scooter 1. Specifically, when wireless communication authentication between the battery pack 20 and the smart device 30 is completed, the ECU 10 is activated by receiving power from the battery pack 20, and performs mutual authentication with the NFC module 100 of the battery pack 20 using the wireless communication technology of the NFC terminal (not shown) of the activated ECU 10.

The interchangeable battery pack 20 according to the present invention is not used after being charged and/or discharged while mounted on the scooter 1, but is detachable and charged with a separate charging device, and since the unique identification number of the battery pack 20 is different, in order to use the replaced battery pack 20, mutual authentication with the ECU 10 of the electric scooter 1 is required. The mutual authentication is performed by the authentication module 140 of the NFC module 100 of the battery pack 20. Specifically, the NFC module 100 receives the unique identification number of the electric scooter 1 stored in the ECU 10 from the NFC terminal (not shown) of the ECU 10 using wireless communication technology, and performs mutual authentication based on whether the received unique identification number of the battery scooter 1 matches the unique identification number of the battery pack 20. For this, a unique identification number of the electric scooter 1 and a unique identification number of the battery pack 20 may be registered and stored in the ECU 10 and used.

In addition, the unique identification number of the battery pack 20 may be stored and used in the authentication module 140 of the NFC module 100 of the battery pack 20. Accordingly, the theft of the electric scooter 1 may be prevented or the theft of the battery pack 20 itself may be prevented through mutual authentication between the ECU 10 and the battery pack 20.

(2) BMS 200

The battery pack 20 according to an embodiment of the present invention may include a BMS 200 that controls the battery pack 20.

The BMS 200 is activated by receiving a driving signal of the battery pack 20 generated by the NFC module 100 using an energy harvesting technology. Specifically, the NFC module 100 receives a wireless communication signal from the smart device 30 and generates a driving signal for the battery pack 20 using an energy harvesting technology. The generated driving signal of the battery pack 20 activates the BMS 200 as a trigger signal.

Meanwhile, the activated BMS 200 supplies power from the battery pack 20 to the NFC module 100 and is used for wireless communication authentication between the smart device 30 and the battery pack 20. Specifically, the activated BMS 200 supplies power from the battery pack 20 to the authentication module 140 of the NFC module 100 to perform wireless communication authentication between the smart device 30 and the battery pack 20.

In addition, when wireless communication authentication between the smart device 30 and the battery pack 20 is completed, the BMS 200 constantly supplies power to the ECU 10 by controlling the ECU power switch 50 connecting the battery pack 20 and the ECU 10 to be on.

Specifically, when wireless communication authentication between the smart device 30 and the battery pack 20 is completed, the NFC module 100 generates a start standby signal and transmits the generated start standby signal to the BMS 200. The BMS 200 receiving the start standby signal controls the ECU power switch 50 connected between the ECU 10 and the battery pack 20 to be turned on and constantly supplies power to the ECU 10 to activate the ECU 10.

Meanwhile, the BMS 200 controls charging and/or discharging of a battery cell (not shown), and controls the electric scooter 1 by receiving a signal for controlling the driving unit (not shown) of the electric scooter 1 from the ECU 10. For example, after the ECU 10 turns on the start of the electric scooter 1, when mutual authentication with the NFC module 100 of the ECU 10 and the battery pack 20 is completed, a command for driving a driving unit (not shown) is received from the ECU 10 and power is supplied or cut off to the driving unit (not shown) to control the operation of the electric scooter 1.

The BMS 200 may control the battery pack 20 using various known techniques.

3) Smart Device 30

The smart device 30 according to an embodiment of the present invention approaches the NFC module 100 of the battery pack 30 and transmits a wireless communication signal.

For this, the smart device 30 may be provided with a wireless communication module (not shown) that transmits a wireless communication signal to the NFC module 100 of the battery pack 30.

In addition, the smart device 30 may be installed with an application (not shown) that checks the state of the battery pack 20 of the electric scooter 1. Specifically, when the wireless communication module (not shown) of the smart device 30 receives information on the battery pack 20 from the NFC module 100 of the battery pack 20 and executes the application (not shown), information of the battery pack 20, for example, a battery remaining amount, a battery charging state, a battery charging rate, an energy harvesting efficiency, and the like, may be visually displayed on the smart device 30.

Meanwhile, a unique identification number used for wireless communication authentication with the battery pack 20 may be stored in the smart device 30. The unique identification number is included in a wireless communication signal transmitted from the smart device 30 to the battery pack 20 and is used for authentication of wireless communication with the battery pack 20.

In the wireless communication authentication, communication authentication is performed in the authentication module 140 of the NFC module 100 using various known techniques.

4) DCDC Converter 40

The electric scooter 1 according to an embodiment of the present invention may further include a DCDC converter 40 for converting high power supplied from the battery pack 30 to the ECU 10 into low power.

When the wireless communication authentication between the battery pack 20 and the smart device 30 is completed, the BMS 200 constantly supplies power to the ECU 10. Specifically, the BMS 200 constantly supplies power to the ECU 10 by controlling the ECU power switch 50 connected between the ECU 10 and the battery pack 20 to be on. In this case, the power supplied from the battery pack 20 may be power having a high value as power supplied to a driving unit (not shown) that operates the electric scooter 1. Accordingly, when the power having the high value is supplied to the ECU 10 as it is, a failure may occur in the ECU 10.

Accordingly, the DCDC converter 40 converts power having a high value supplied from the battery pack 20 into power having a low value in order to supply low power to the ECU 10.

The DCDC converter 40 converts high power into low power using various known methods and supplies the low power to the ECU 10.

5) ECU Power Switch 50

The electric scooter 1 according to an embodiment of the present invention may further include an ECU power switch 50 for supplying power from the battery pack 20 to the ECU 10 when wireless communication authentication is completed between the battery pack 20 and the smart device 30.

Specifically, when the wireless communication authentication is completed, the ECU power switch 50 generates a start standby signal in the authentication module 140 and transmits the start standby signal to the BMS 200, and the BMS 200 receiving the start standby signal may supply power from the battery pack 20 to the ECU 10 by controlling the ECU power switch 50 to be on.

For this, the ECU power switch 50 may be connected between the ECU 10 and the battery pack 20.

2. Method of Turning on Start of Electric Scooter Using Wireless Communication Type Interchangeable Battery Pack According to Embodiment of Present Invention FIG. 5 is a flow chart showing a method of turning on the start of an electric scooter using a wireless communication signal according to an embodiment of the present invention.

Hereinafter, a method of turning on the start of an electric scooter using a wireless communication signal according to an embodiment of the present invention will be described with reference to FIG. 5.

A method of turning on the start of an electric scooter using a wireless communication signal according to an embodiment of the present invention may include contacting the smart device 10 near the battery pack 20 S100, receiving a wireless communication signal from the smart device 10 S102, generating a driving signal of the battery pack 20 using the received signal S104, transmitting the generated driving signal to the battery pack 20 S106, driving the battery pack 20 using the transmitted driving signal S200, supplying power to the NFC module 100 by the battery pack 20 driven using the driving signal S202, performing mutual authentication with the smart device 30 by the NFC module 100 using the supplied power S108, generating a start standby signal S110 when the unique identification numbers of the smart device 30 and the electric scooter 1 match each other in the performing of the mutual authentication S108, transmitting the generated start standby signal to the battery pack 20 S112, and supplying power to the ECU 10 by the battery pack 20 receiving the start standby signal S204. Hereinafter, each step will be described in detail.

(1) Smart Device Contact Step S100

Specifically, the contacting of the smart device 10 near the battery pack 20 S100 is a step for transmitting a wireless communication signal to the battery pack 20 through a wireless communication module (not shown) of the smart device 10. In wireless communication technology according to the present invention, since the NFC module 100 for receiving and communicating wireless communication signals within a suitable distance is provided in the battery pack 20, the smart device 10 should be brought close to the battery pack 20 within a suitable distance. For this reason, it is possible to prevent the battery pack 20 of the electric scooter 1 from malfunctioning due to a malfunction of the smart device 30 when the user is far away.

(2) Wireless Communication Signal Reception Step S102

On the other hand, the receiving of the wireless communication signal from the smart device 10 S102 is a step of receiving a wireless communication signal transmitted from the smart device 10 by the NFC module 100 of the battery pack 20. The received wireless communication signal is used as a power source for driving the BMS 200 of the battery pack 20 using energy harvesting technology.

(3) BMS 200 Driving Signal Generation Step S104

Meanwhile, the generating of the driving signal of the BMS 200 S104 is a step of generating a wireless communication signal received from the smart device 30 as a signal for driving the BMS 200 using an energy harvesting technology. This is generated in the contact module 120 of the NFC module 100.

(4) BMS 200 Driving Signal Transmission Step S106

Meanwhile, the generated driving signal of the battery pack 20 is converted into a DC signal in the signal conversion unit 124 of the NFC module 100, and is transmitted to the BMS 200 through the signal transmission unit 126 of the NFC module 100 S106.

(5) BMS 200 Driving Step S200

Meanwhile, the BMS 200 is driven S200 when a driving signal is received through the signal transmission unit 126. Specifically, when receiving the driving signal, the BMS 200 is activated through a trigger operation.

(6) Authentication Module 140 Activation Step S202

On the other hand, when the BMS 200 is driven, the BMS 200 supplies power of the battery pack 20 to the NFC module 100. Specifically, the BMS 200 supplies power to the authentication module 140 of the NFC module 100 to activate the authentication module 140 S202. After the authentication module 140 is activated, the authentication module 140 performs wireless communication authentication using a wireless communication signal received from the smart device 30 by the NFC module 100 to be described later.

(7) Wireless Communication Authentication Step S108

Meanwhile, the NFC module 100 receives power from the battery pack 20 and performs wireless communication authentication S108 using a wireless communication signal received from the smart device 30. The wireless communication authentication step S108 determines whether the unique identification number of the smart device included in the wireless communication signal received from the smart device 30 matches the unique identification number of the scooter stored in the battery pack 20. The wireless communication authentication step S100 is performed by the authentication module 140 of the NFC module 100.

(8) Start Standby Signal Generation Step S110

On the other hand, in the wireless communication authentication step S108, when the smart device unique identification number and the scooter unique identification number match, the authentication module 140 generates a start standby signal for the battery pack 20 to supply power to the ECU 10 S110.

(9) Start Standby Signal Transmission Step S112

Meanwhile, the start standby signal generated in the start standby signal generation step S110 is transmitted to the BMS 200 S112.

(10) Start Standby Step S204

Meanwhile, when the BMS 200 receives the start standby signal transmitted in the start standby signal transmission step S112, it supplies power to the ECU 10 to turn on the start of the electric scooter 1. Specifically, the BMS 200 receiving the start standby signal controls the ECU power switch 50 connected between the ECU 10 and the battery pack 20 to be turned on and always supplies power to the ECU 10. Therefore, the ECU 10 is activated in the start standby mode S204, and when the user presses the power switch, the electric scooter 1 can be started.

What is claimed is:

1. A method of starting an electric scooter using a wireless communication type interchangeable battery pack, the method comprising:
    providing a near field communication (NFC) module in an interchangeable battery pack of an electric scooter, the NFC module receiving a wireless communication signal from a smart device;
    using the received wireless communication signal as a driving signal for an interchangeable battery pack;
    when the interchangeable battery pack is driven, supplying power to an NFC module to perform wireless communication authentication between the NFC module and the smart device;
    supplying power to an electronic control unit (ECU) by the interchangeable battery pack when mutual wireless communication authentication is completed; and
    turning on, by the ECU, the start of the electric scooter using the supplied power.

2. The method of claim 1, wherein the using of the wireless communication signal received from the smart device as an interchangeable battery pack driving signal comprises:
    generating the interchangeable battery pack driving signal using the wireless communication signal received from the smart device; and
    driving a battery management system (BMS) of the interchangeable battery pack using the generated driving signal.

3. The method of claim 1, wherein the performing of the mutual wireless communication authentication by the NFC module and the smart device comprises:
    comparing a unique identification number stored in the smart device with a unique identification number stored in the NFC module of the electric scooter; and
    generating, by the NFC module, a start standby signal when the unique identification numbers of the smart device and the electric scooter are the same in the comparing of the unique identification numbers.

4. The method of claim 3, wherein the supplying of power to the ECU comprises:
    transmitting the generated start standby signal to a battery management system (BMS) of the interchangeable battery pack; and
    supplying, by the BMS, power to the ECU by turning on an ECU power switch.

5. A wireless communication type interchangeable battery pack for supplying power to an electric device, comprising:
    a near field communication (NFC) module configured to:
        receive a wireless communication signal from a smart device; and
        apply a driving signal to the interchangeable battery pack to perform wireless communication authentication by receiving power from the battery pack when the interchangeable battery pack is driven; and a battery management system (BMS) configured to supply power to the electric device based on the wireless communication authentication, wherein the NFC module comprises:
   a contact module configured to:
      receive the wireless communication signal from the smart device, and
      use the received wireless communication signal to generate an interchangeable battery pack driving signal, and
   an authentication module configured to authenticate the interchangeable battery pack using the wireless communication signal received from the smart device.

6. The wireless communication type interchangeable battery pack of claim 5, wherein the contact module further comprises:
   an energy collection unit configured to use the wireless communication signal received from the smart device to generate the interchangeable battery pack driving signal using an energy harvesting technology;
   a signal conversion unit configured to convert the generated interchangeable battery pack driving signal into a DC signal; and
   a signal transmission unit configured to transmit the converted DC signal to the BMS.

7. The wireless communication type interchangeable battery pack of claim 6, wherein the DC signal converted by the signal conversion unit activates the BMS.

8. The wireless communication type interchangeable battery pack of claim 5, wherein the BMS is further configured to:
   supply power to a driving unit of the electric device to operate the electric device; or
   control charging or discharging of the interchangeable battery pack.

9. The wireless communication type interchangeable battery pack of claim 5, wherein the BMS is further configured to supply power to the electric device if the interchangeable battery pack is authenticated based on the wireless communication signal received from the smart device.

10. The wireless communication type interchangeable battery pack of claim 5, wherein:
   the NFC module is configured to store a unique identification number for the electric device; and
   the BMS is further configured to supply power to the electric device if the unique identifier stored in the NFC module matches a unique identification number for the smart device included in the wireless communication signal received from the smart device.

11. A device, comprising the interchangeable battery pack according to claim 5 configured as a power source.

12. The device of claim 11, wherein the device is any one of: an electric bike, an electric bicycle, an electric kickboard, an electric scooter, an electric vehicle, a hybrid electric vehicle, and a plug-in hybrid electric vehicle.

\* \* \* \* \*